Patented Mar. 2, 1948

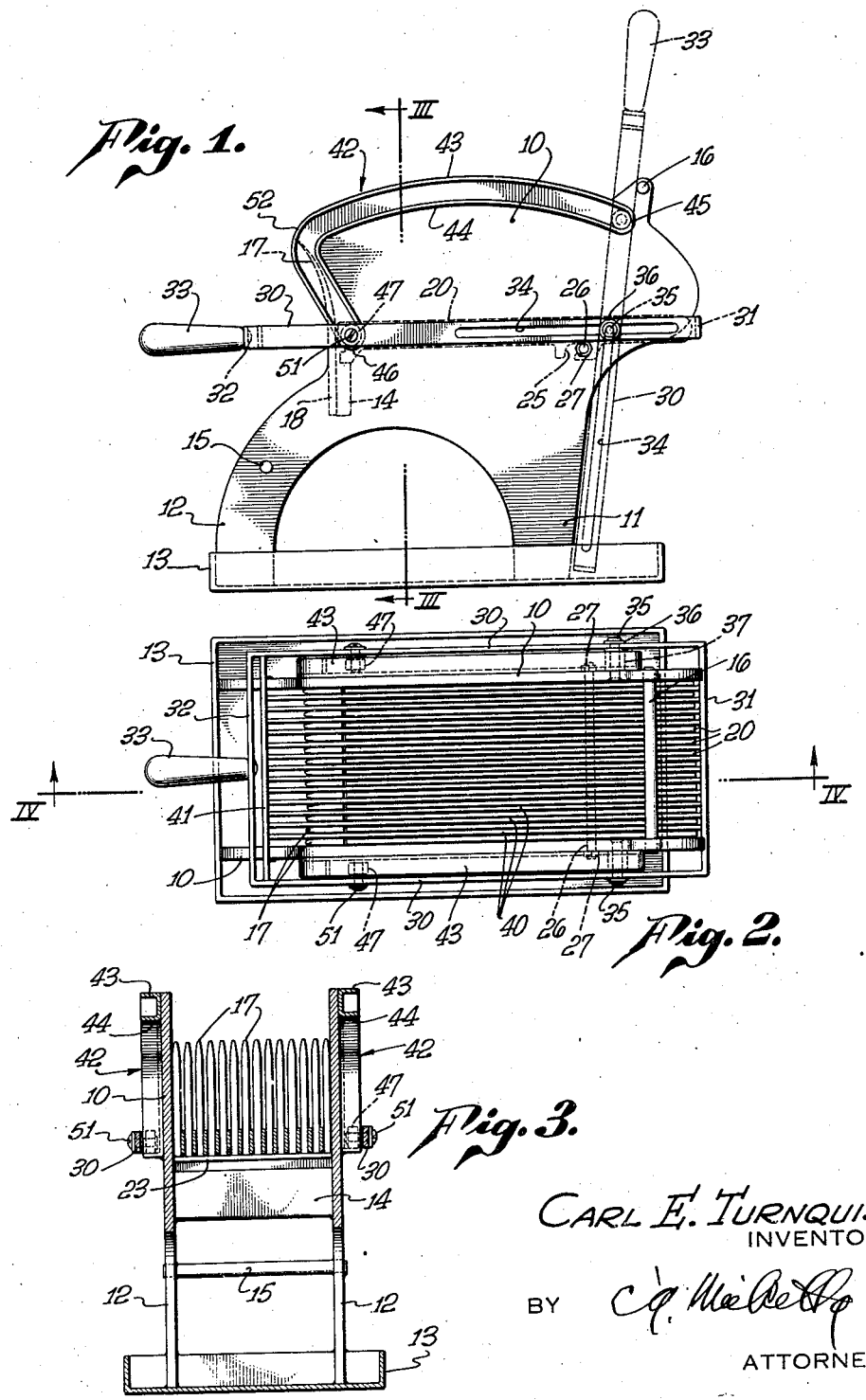

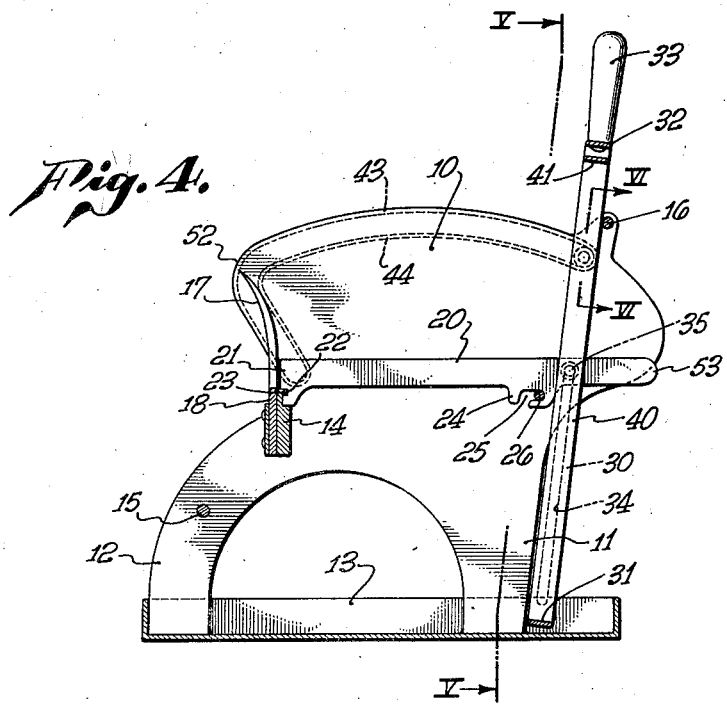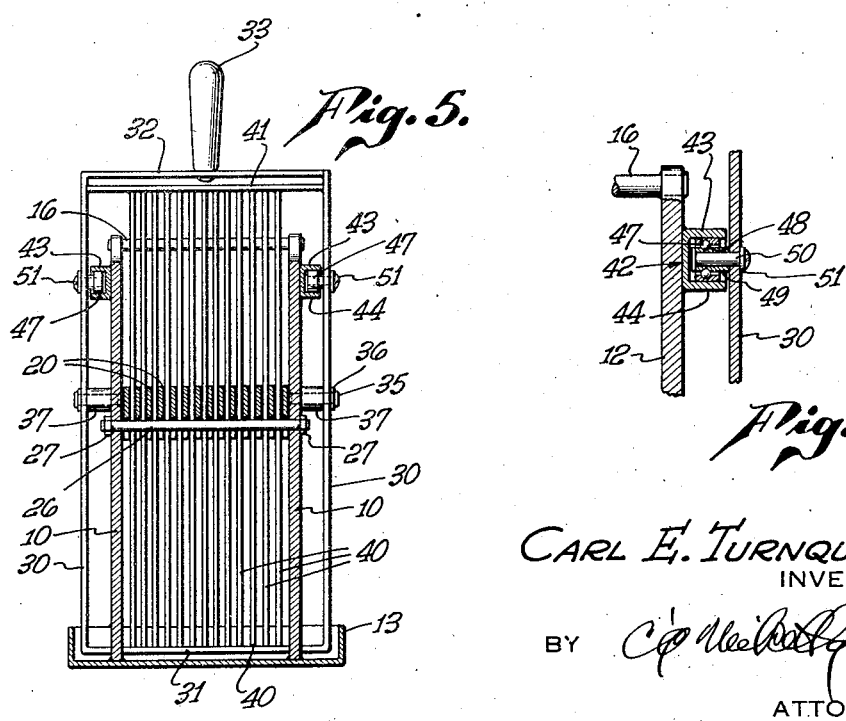

2,436,982

UNITED STATES PATENT OFFICE 2,436,982

FOOD SLICER WITH SWINGING PLURAL SPACED KNIVES

Carl E. Turnquist, San Gabriel, Calif.

Application January 22, 1945, Serial No. 573,908

4 Claims. (Cl. 146—147)

My invention relates to slicing devices for food and has particular reference to a multiple slicing device which will cut a food substance into a number of separate, thin and uniform slices with one operation of the device.

A variety of slicers have been used in the past and among the better known are egg and butter slicers which feature a series of evenly spaced knives or wires adapted to slice eggs and blocks of butter into uniform slices. These slicers known to the prior art present definite limitations when it becomes necessary to cut food of other types into uniform slices. One of the reasons is the lack of a true slicing movement which is necessary particularly in fibrous foods if the cut is to be clean, which results in loss of juices in many fruits, such for example, as strawberries and oranges which are particularly juicy. It also becomes desirable to vary the width of the slices depending upon the type of food or fruit sliced or depending upon how the slices are to be prepared for consumption.

Therefore, among the objects of my invention is to provide a new and improved food slicer which is universally adaptable to a wide variety of types of foods, such as fruits, vegetables, mushrooms, and even butter and cheese.

Another object of my invention is to provide a new and improved food slicer which is capable of slicing in one operation an entire piece of fruit or vegetable into a number of slices of uniform thickness or a quantity of small fruits or vegetables.

Still another object of my invention is to provide a new and improved food slicer which is semi-automatic in its operation so that as knives are brought into contact with the food to be sliced they are drawn through a slicing or knifelike action, the device being so arranged that straight downward pressure is eliminated in favor of a slicing motion, thereby eliminating squeezing and crushing fruit and forcing juice out of the fruit.

Still another object is to provide a food slicer where a plurality of knives cooperate with a plurality of shear plates or strips in such a manner that the knives pass into contiguous relationship with the shear plates after the slicing operation has been performed so that the sliced food may be quickly and conveniently removed backward through an open space into a receptacle.

A further object of my invention is to provide a slicer having multiple slicing elements which are so arranged that they can be readily removed for sharpening or, if desired, can be shifted in order to vary the thickness of the slices which are made.

A still further object is to provide a food slicer which is so arranged that relatively perfect and uniform slices may be made and particularly so that all the juice may be retained in the fruit itself.

With these and other objects in view, my invention consists in the construction, arrangement and combination of the various parts of my device whereby the objects contemplated are attained, as hereinafter more fully set forth, pointed out in my claims and illustrated in the accompanying drawings, in which:

Fig. 1 is a side elevational view of the device.

Fig. 2 is a top view of the device.

Fig. 3 is a cross-sectional view taken on the line III—III of Fig. 1.

Fig. 4 is a longitudinal, sectional view of the device taken on the line IV—IV of Fig. 2.

Fig. 5 is a longitudinal, sectional view from the front taken on the line V—V of Fig. 4.

Fig. 6 is a fragmentary, sectional view taken on the line VI—VI of Fig. 4.

Slicers of the kind comprising the present invention are those which are relatively small in overall size so that they can be used on the counters of restaurants and drug stores where it is necessary to slice quick, small orders of fruits, vegetables and other foods. To be able to slice fruits or vegetables completely in one operation saves a great deal of time for the operator. Likewise to be able to place a fruit or vegetable in a machine and perform the slicing operation in such a manner that all of the juice is retained in the fruit itself presents a highly desirable feature. Although there have been provided a wide variety of types of slicers and particularly bread slicers, these additional features have not been incorporated and the devices have likewise failed to incorporate a very simple slicing action which produces a to and fro cutting motion of knives while they are being passed through the food to a position which leaves the food in a sliced form entirely free for removal.

In the embodiment chosen to illustrate my invention there is provided a set of side frames 10 provided with rear legs 11 and front legs 12 which support the slicer in a pan or tray 13. The frames are also held in place by means of a shaft 15 which extends between the front legs 12 and a shaft 16 at the top of the side frames toward the rear. These shafts may be bolts provided with suitable nuts on the inside and outside of the frames so that the frames are rigidly positioned in the proper location.

At the front of the slicer there is provided a set of spaced pickets 17 having in general the appearance of a comb and provided with a solid base 18 which is positioned adjacent the brace 14. The pickets are preferably tapered to some extent to facilitate admission of cutting knives into the slots between the pickets. It has been found practical to employ individual pickets separated by spacers and secured together by bolts or other means so that they may be attached to the frame in the proper location. Where circumstances permit, however, they may be punched from a piece of sheet material.

At substantially the mid portion of the slicer there are provided a series of stationary shear plates or strips 20 which are positioned on edge with their flat faces perpendicular to the bottom and presenting their top edges in a plane which forms in a sense a platform upon which food is positioned for slicing. There are a great number of these shear plates spaced approximately opposite the pickets so that together they form a relatively solid base or support for the food. Spacers may be provided between the respective shear plates in order to hold them in their proper position.

Further, if desired, the shear plates may be made demountable as illustrated particularly in Fig. 4. For this purpose the front end 21 of the shear plate may be provided with a recess 22 which hooks around a bead 23 at the upper end of the frame into which it can be slid by an endwise movement. Once in position the plates remain in fixed position spaced laterally with respect to each other.

Adjacent the rear the shear plate may be provided with a downwardly extending portion 24 provided with a bayonet slot 25 adapted to receive in it a cross bar 26. By use of a construction of this kind the plates may be positioned in the machine and the cross bar then tightened by means of nuts 27 so that they remain in their proper location at all times. Whenever it is desired to remove the shear plates it is necessary only to loosen the nuts so that the plates are free to be removed, whereupon they may then be withdrawn by pulling the bayonet slot 25 rearwardly relative to the cross bar 26. The same motion will release the front end of the shear plate from the beaded projection on the frame.

A knife frame consists of lateral elements 30, a rear element 31, and a front element 32 provided with a handle 33. The lateral elements are provided with elongated slots 34 at the side within which are positioned pins 35, one on each side which by means of washer 36 form a sliding pivot support for the knife frame. It will be noted that the pins extend only into the side frames and that the side elements of the knife frame are spaced in proper position by means of collars 37.

Within the knife frame is a set of cutting blades 40 which are secured at one end in the rear element 31 and at the other end in a portion 41 of the front frame element. The knives may be attached to the frame by bolting or some similar conventional means so that they can be readily removed for sharpening and replacement or so that some can be taken out when not needed. The spacing of the knife blades is such that they fit within the spaces between the shear elements with only a slight amount of clearance.

In order to give proper motion to the knife blades during the cutting operation there is provided a pair of substantially L-shaped members 42 which extend in a curve along the top of the side frames and downwardly in an angular direction at the front of the side frames. These L-shaped members each have an upper flange 43 and a lower flange 44, whereas the upper curved portion has a closed end 45 toward the rear and a closed end 46 at the front. The lateral elements of the knife frame are provided each with a roller 47 mounted by means of bearings 48 upon a collar 49 which is supported by a suitable shaft 50 secured through the agency of a head 51 in proper position upon the side element. The roller 47 fits within the frames with a slight clearance so that as the roller is moved it need roll upon one flange only at a time and the knife frame cannot be pulled up by the operator.

In operation, the knife frame is first moved upwardly to the dotted position shown in Fig. 1 which corresponds to the full line position shown in Fig. 4. At this point the knife frame will have fallen so that the pin 35 is received in the upper end of the slot. Food such as vegetables or fruits are then placed upon the top edges of the shear plates 20 where it rests and where it is prevented from moving forward or backward to any point beyond the inside faces of the pickets. When the knife frame is in operating position, the bottoms of the knives join in forming one wall of a four-walled container to hold the fruit or vegetable preparatory to cutting. The slicing operation is started by pulling the handle 33 forward. As the blades of the knife frame strike against the food they move upwardly and forwardly a slight amount, thereby imparting a slicing motion to the blades. This continues as the roller 47 rolls between the flanges 43 and 44 until the roller reaches a front corner 52 at which point the motion of the front end of the knife frame will be directed downwardly and at the same time rearwardly, automatically drawing the knife blades through a reverse slicing movement. This motion of the knife blades thus described is a to and fro slicing motion which acts as a knife upon the food which is held in the slicer. When the knife frame occupies its lowermost position as shown in Fig. 1, the knife blades occupy a position between the shear plates such that the then uppermost edges of the knife blades are substantially flush with the upper edges of the shear plates forming thereby what has the benefits of a solid, smooth-surfaced floor or platform supporting the already sliced food. The sliced food can then be readily passed over the platform toward the rear of the slicing device from which it can be removed. The shear plates are provided with rearwardly extending portions 53 to facilitate removal of the sliced food. Whatever small amount of juice or fragments of the food is lost will be caught in the pan 13.

Should it be desired to cut food in slices thicker than provided by the knife blade arrangement shown in Fig. 2, for example, it is possible to remove every alternate knife blade. It is not, however, necessary to make any change in the number and position of the shear plates 20. It is sufficient only that the remaining knife blades be positioned a distance apart corresponding to the desired thickness of the slices. Slicing action follows the pattern previously described.

During all of the operation manipulation of the machine is greatly facilitated by use of the shafts 15 and 16 as hand holds while manipulating the knife blades by means of the handle 33.

There has thus been provided a simple and compact slicing device for fruits and vegetables and other soft foods which is capable of imparting a slicing movement to a set of knives in order to make a smooth, even cut and one which at the same time can be readily cleaned by operators for further operation at the expenditure of a minimum of time and effort. In view of the usual necessity for daily cleaning, the simplicity of the device makes it highly advantageous. Likewise the construction and operation are such that the device is a desirable one where juices are to be retained in the fruit and where cleanliness of the premises is at a premium.

I claim:

1. A fruit slicer comprising a base, a drain pan adapted to receive the base, a stationary shear plate mounted on the base including a plurality of elongated shear strips disposed in a substantially horizontal position and presenting an edge to form a composite bottom for a fruit receptacle, side walls on the base forming sides for the fruit receptacle and a plurality of spacers forming a front therefor, each spacer being in alignment with one of said shear strips, a knife frame comprising a rear element, lateral elements and a front element provided with a handle, a longitudinal slot in each lateral element and a pin on the base extending through the slot providing thereby a sliding pivot connection for the knife frame, a pair of curved L-shaped recesses having the long leg of each extending along the top of one side wall and the short leg extending downwardly toward the bottom of the fruit receptacle, a roller projection on each lateral frame element extending into the L-shaped recess and adapted to be guided thereby, a set of elongated knife members secured between the rear and front elements of the frame and transverse hand holds extending from one side to the other of the base, said frame and members having an elevated removed position away from the stationary shear strips and a final position after traversing a shearing path between the spacers and shear strips such that the backs of the knife members lie in a position substantially flush with the upwardly exposed edges of the shear strips.

2. A fruit slicer comprising: a receptacle mounted upon legs, said receptacle comprising a bottom consisting of a plurality of longitudinally extending, spaced shear strips, upstanding sides, a front comprising a plurality of upwardly extending pickets in alignment with the shear strips and a normally open back; a frame provided with a plurality of knife blades extending between said shear strips, said knife frame and blades being pivotally connected to the receptacle adjacent the rear portion thereof and in the plane of the bottom; an L-shaped cam way in an upstanding side of the receptacle and a follower carried by the knife frame and cooperating with the cam way to impart a slicing motion to the knives when the frame is pivotally moved, said blades being movable from a substantially vertical position wherein the blades form a back for the receptacle to a horizontal position in which the blades are in the slots between the shear strips and combine therewith to form a substantially solid bottom for the receptacle.

3. A fruit slicer comprising: a receptacle mounted upon legs, said receptacle comprising a bottom consisting of a plurality of parallel, longitudinally entending, spaced shear strips, upstanding sides, a front comprising a plurality of upwardly extending, spaced pickets in alignment with the shear strips, and a normally open back; a frame provided with a plurality of knife blades extending between said shear strips, said knife frame and blades having a sliding pivot connection with the receptacle adjacent the rear portion thereof and in the plane of the bottom, said frame and blades being jointly movable from a substantially vertical position wherein the blades form a back for the receptacle to a horizontal position in which the blades are in the slots between the shear strips and combine therewith to form a substantially solid, smooth-surfaced bottom for the receptacle whereby sliced fruit resting upon said bottom may be discharged from the receptacle through the now open back.

4. In a fruit slicer of the character stated in claim 3, the provision of cooperating means carried by the frame and the upstanding sides of said receptacle to impart to and fro slicing motion to the knife blades while said frame and knife blades are moved from a substantially vertical position to the horizontal position.

CARL E. TURNQUIST.

REFERENCES CITED

The following references are of record in the file of this patent:

UNITED STATES PATENTS

| Number | Name | Date |
|---|---|---|
| 1,753,371 | Georgopoulos | Apr. 8, 1930 |
| 2,073,257 | Van Riper | Mar. 9, 1937 |

FOREIGN PATENTS

| Number | Country | Date |
|---|---|---|
| 294,520 | Germany | Nov. 25, 1913 |
| 343,288 | Germany | Oct. 29, 1921 |